（12) United States Patent
Mukherjee

(10) Patent No.: US 10,649,954 B2
(45) Date of Patent: May 12, 2020

(54) SELECTIVE EXTRACTION OF INFORMATION FROM A MIRRORED IMAGE FILE

(71) Applicant: NetApp Inc., Sunnyvale, CA (US)

(72) Inventor: Sandeep Mukherjee, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 278 days.

(21) Appl. No.: 15/361,686

(22) Filed: Nov. 28, 2016

(65) Prior Publication Data

US 2017/0147591 A1   May 25, 2017

Related U.S. Application Data

(63) Continuation of application No. 11/963,473, filed on Dec. 21, 2007, now Pat. No. 9,507,784.

(51) Int. Cl.
| G06F 16/00 | (2019.01) |
| G06F 16/13 | (2019.01) |
| G06F 16/14 | (2019.01) |
| G06F 16/18 | (2019.01) |

(52) U.S. Cl.
CPC ............ G06F 16/13 (2019.01); G06F 16/148 (2019.01); G06F 16/1873 (2019.01)

(58) Field of Classification Search
None
See application file for complete search history.

(56) References Cited

U.S. PATENT DOCUMENTS

| 5,630,049 A | 5/1997 | Cardoza et al. |
| 5,642,505 A | 6/1997 | Fushimi |
| 5,854,894 A * | 12/1998 | Lancaster ........... H04L 49/3081 709/219 |
| 5,859,972 A | 1/1999 | Subramaniam et al. |
| 5,946,690 A | 8/1999 | Pitts |
| 5,956,725 A | 9/1999 | Burroughs et al. |
| 5,968,176 A | 10/1999 | Nessett et al. |
| 5,983,324 A | 11/1999 | Ukai et al. |

(Continued)

FOREIGN PATENT DOCUMENTS

WO   2005048085 A2   5/2005

OTHER PUBLICATIONS

Int. Search Report/Written Opinion cited in PCT Application No. PCT/US2008/087661 dated Jun. 26, 2009, 11 pgs.

(Continued)

*Primary Examiner* — Thu N Nguyen

(74) *Attorney, Agent, or Firm* — Cooper Legal Group, LLC

(57) ABSTRACT

An embodiment of the invention provides a method to extract selected information from an image file selectively without requiring the user to restore, on the destination storage server, the image file which has the data for a file system. The selected information can be, for example, contents of a file, contents of a directory, other information from the image file. The selected information can be selectively extracted by reading the blocks of the file from the WAFL data structures that has been stored in the image file. An index file is generated and this index file tracks the location of VBNs (virtual block numbers) in an image file so that the user can easily obtain the selected information from disk blocks that are identified by these VBNs.

17 Claims, 14 Drawing Sheets

(56) References Cited

U.S. PATENT DOCUMENTS

| | | |
|---|---|---|
| 6,289,356 B1 | 9/2001 | Hitz et al. |
| 6,983,296 B1 | 1/2006 | Muhlestein et al. |
| 6,993,539 B2 | 1/2006 | Federwisch et al. |
| 7,143,307 B1 | 11/2006 | Witte et al. |
| 7,200,726 B1 | 4/2007 | Gole et al. |
| 7,409,494 B2 | 8/2008 | Edwards et al. |
| 7,555,620 B1 | 6/2009 | Manley |
| 7,631,159 B1 | 12/2009 | Krishnamurthy |
| 7,681,069 B1 | 3/2010 | Chellappa et al. |
| 7,694,088 B1 | 4/2010 | Bromley et al. |
| 7,743,028 B1 | 6/2010 | Stringham et al. |
| 7,809,692 B1 | 10/2010 | Pruthi et al. |
| 8,190,836 B1 | 5/2012 | Zheng et al. |
| 2002/0049718 A1* | 4/2002 | Kleiman ............ G06F 11/1435 |
| 2002/0133491 A1 | 9/2002 | Sim et al. |
| 2003/0093439 A1 | 5/2003 | Mogi et al. |
| 2003/0182317 A1* | 9/2003 | Kahn ................ G06F 17/3015 |
| 2003/0182502 A1 | 9/2003 | Kleiman et al. |
| 2004/0030668 A1 | 2/2004 | Pawlowski et al. |
| 2004/0221125 A1 | 11/2004 | Ananthanarayanan et al. |
| 2005/0027748 A1* | 2/2005 | Kisley ............... G06F 11/2074 |
| 2005/0246382 A1 | 11/2005 | Edwards |
| 2006/0143238 A1 | 6/2006 | Tamatsu |
| 2006/0155775 A1* | 7/2006 | Yamasaki ............... G06F 3/061 |
| 2006/0218561 A1 | 9/2006 | Moir et al. |
| 2006/0225065 A1 | 10/2006 | Chandhok et al. |
| 2007/0022117 A1* | 1/2007 | Keohane ............ G06F 11/1435 |
| 2007/0043790 A1* | 2/2007 | Kryger ................ G06F 16/31 |
| 2007/0162515 A1 | 7/2007 | Sarma et al. |
| 2007/0180295 A1* | 8/2007 | Byrne ................ G06F 11/1076 714/6.12 |
| 2007/0266056 A1 | 11/2007 | Stacey et al. |
| 2007/0266066 A1 | 11/2007 | Kapoor et al. |
| 2008/0077762 A1 | 3/2008 | Scott et al. |
| 2008/0133828 A1 | 6/2008 | Saito |
| 2008/0243958 A1 | 10/2008 | Prahlad et al. |
| 2009/0019362 A1 | 1/2009 | Shprigel et al. |
| 2009/0043828 A1 | 2/2009 | Shitomi |
| 2009/0112703 A1 | 4/2009 | Brown |
| 2009/0125701 A1 | 5/2009 | Suponau et al. |
| 2009/0313503 A1 | 12/2009 | Atluri et al. |
| 2010/0077160 A1 | 3/2010 | Liu et al. |
| 2010/0100528 A1 | 4/2010 | Brockway et al. |

OTHER PUBLICATIONS

Hakala T., "VMware Data Recover, file level restores," http://v-reality.info/2009/08/vmware-data-recovery-file-level-restores/, Aug. 28, 2009, 4 pgs.

International Preliminary Report on Patentability for Application No. PCT/US2008/087661 dated Jun. 22, 2010, 5 pages.

Co-Pending U.S. Appl. No. 12/391,849, filed Feb. 24, 2009, 66 pages.

Co-Pending U.S. Appl. No. 12/871,778, filed Aug. 30, 2010, 33 pages.

Vmware Data Recovery 1.0 Evaluator's Guide, Vmware, Jun. 30, 2009, 25 pgs.

* cited by examiner

| Class Name | VolInfo |
|---|---|
| Type | Base Class, Virtual |
| Description | This class represents an abstraction of the VolInfo data structure. |

Member Functions:

| Function Name | Type | Description |
|---|---|---|
| get_fsinfo() | Regular | This function returns an FSinfo object for the given snapid. If no snapid is provided, snapid 0 is used (active filesystem) |
| get_fsinfo_vbn() | Virtual | Given a snapid, returns the Volume Block Number where the FSInfo structure is located. If no snapid is provided, snapid 0 is used. |
| is_wvol() | Virtual | Returns TRUE if the volume is a flexvol, FALSE if it's a tradvol. |
| get_snapids() | Virtual | Returns a list of snapids in the volume. |

| Class Name | FSInfo |
|---|---|
| Type | Base Class, Virtual |
| Description | This class represents an abstraction of the FSInfo data structure. |

Member Functions:

| Function Name | Type | Description |
|---|---|---|
| walk_path() | Regular | Given a full pathname, looks up each component of the pathname recursively. Returns an inode object representing the last component of the pathname. Optionally, use the metadir. |
| get_inofile_inode() | Virtual | Returns an inode object representing the inode of the inodefile. |
| get_inode() | Virtual | Given an inode number, returns the corresponding inode object. |
| get_create_time() | Virtual | Returns the time when this FSInfo was created. |

| Class Name | VBNFile |
|---|---|
| Type | Base Class, Virtual |
| Description | This class represents an abstract object that can provide a WAFL block given a VBN. |

Member Functions:

| Function Name | Type | Description |
|---|---|---|
| getblock() | Virtual | Given a VBN, return the actual WAFL block. |
| get_ontap_version() | Regular | Returns the Ontap version of this volume image. |
| get_VolInfo() | Regular | Returns a VolInfo object for this volume image. |

| Class Name | SMDump. Derived from VBNFile |
|---|---|
| Type | Derived Class |
| Description | This class represents a SM2T image file. |

Member Functions:

| Function Name | Type | Description |
|---|---|---|
| getblock() | Regular | Given a VBN, return the actual WAFL block. |
| SMDump | Constructor | Creates a new SMDump object using user specified pathnames for SM2T image file and index file. |

| Class Name | DirBlock |
|---|---|
| Type | Base Class |
| Description | This class represents the contents of a directory. It provides functions to access the directory entries of the directory. |

Member Functions:

| Function Name | Type | Description |
|---|---|---|
| DirBlock() | Constructor | Create a new DirBlock object using a given inode object. |
| begin_dirwalk() | Regular | Start iteration of all directory entries in the directory. This must be called prior to starting directory listing. |
| next_ent() | Regular | Return the next directory entry object. |

FIG. 10A

| | | |
|---|---|---|
| close_dirwalk() | Regular | Finish directory entry iteration, and free up resources if needed. |
| find_dirent() | Regular | Given a the name and type of a directory entry, search the directory blocks and return an object representing that directory entry. An error is returned if the directory entry is not found. |
| get_max_dirents() | Regular | What is the number of directory entries this inode can possibly have. This is different from the number of directory entries it actually has. |
| get_dirent() | Regular | Get the directory entry at a specified position. |

| | |
|---|---|
| Class Name | WaflDirent |
| Type | Base Class |
| Description | This class represents a directory entry in WAFL format. This class is implemented as a mutable object, that is its properties can be changed dynamically. This is because directory listing may produce a large number of directory entries, and it is inefficient to create and destroy a WaflDirent object every time. |

Member Functions:

| Function Name | Type | Description |
|---|---|---|
| WaflDirent() | Constructor | Create a new empty WaflDirent object. A newly created object does not represent any particular directory entry. |
| set_name() | Regular | Sets the name and inode number of this object to those supplied. From this point, this object represents the supplied directory entry, till a subsequent set_name() invocation. |
| get_name | Regular | Return the name of this directory entry. get_name must have been called prior to this invocation. |
| get_inum | Regular | Get the inode number of this directory entry. set_name must have been called prior to this invocation. |

| | |
|---|---|
| Class Name | BuftreeWalker |
| Type | Base Class, Virtual |
| Description | This class is a utility class. An instance of this class is passed to functions that iterate over level zero blocks of an inode. As these functions traverse the buftree, they call various functions of this class. User applications should derive and create implementations of this virtual class. The derived class member functions can do various processing like capturing the data in a file or printing statistics. |

Member Functions:

| Function Name | Type | Description |
|---|---|---|
| gotbuf() | Virtual | This function gets called when a buftree iterator function encounters a level zero block. The data buffer is passed to this function. |
| gothole() | Virtual | This function gets called when one or more "hole blocks" are encountered. The number of hole blocks encountered are passed to this function. |
| set_abortflag() | Virtual | If this function is called, the iterating function will abort and return immediately. |

| | |
|---|---|
| Class Name | Inode |
| Type | Base Class |
| Description | This class represents a WAFL Inode data structure. |

Member Functions:

| Function Name | Type | Description |
|---|---|---|
| Inode() | Constructor | Create an Inode object given a FSinfo object and an inode number. |
| get_type() | Virtual | Return the inode type. This might be regular file, directory, socket, NT streamdir, ACL, etc. |
| get_toplevel_vbn() | Virtual | An inode stores a few VBNs representing the top of the buftree. This function returns the top level VBN at the given index. |
| get_block_pointer() | Virtual | Indirect blocks contain pointers to other blocks. This function returns the pointer contained at a specified location, given an indirect buffer. |

FIG. 10B

| | | |
|---|---|---|
| Walk_buftree() | Regular | Iterates over all level zero blocks of the inode. An instance of a BuftreeWalker needs to be passed to this function. |
| Num_blockpointers_per_block | Virtual | How many blockpointers are stored in one WAFL buffer? It's different for fileinfos and tradivols. |
| Get_data_in_inode_data() | Virtual | If the data is small enough to fit inside an inode, retrieve it. |
| Num_toplevel_vbns() | Virtual | How many top level VBNs fit inside the inode? |
| Get_streamdir() | Virtual | Get the VBN of the streamdir if this inode has one. |
| Get_level() | Virtual | How many levels does this inode's buftree have? |
| Get_size() | Virtual | Get size of the file. |
| Get_blocks() | Virtual | How many blocks does this inode's buftree have? |
| Get_mtime() (also get_ctime, get_crtime, get_atime) | Virtual | When was this inode last modified? |
| Get_inum() | Virtual | Get the inode number of this inode. |
| Get_inode() | Virtual | This function can only be invoked from an object representing the inode of the inode file. Given an inode number, return a new inode object representing that inode. |
| Get_fileblock() | Regular | Given an FBN, returns the data block for that inode. If the FBN is a hole, a return flag is set. Attempts to fetch a block beyond the size of the file raises an error. |
| Get_dirblock() | Regular | Creates a dirblock object representing the directory blocks of an inode. This function can only be invoked on an inode of type Directory of type Stream Directory. |

FIG. 10C

SELECTIVE EXTRACTION OF INFORMATION FROM A MIRRORED IMAGE FILE

RELATED APPLICATIONS

This application claims priority to and is a continuation of U.S. application Ser. No. 11/963,473, filed on Dec. 21, 2007, now allowed, titled "SELECTIVE EXTRACTION OF INFORMATION FROM A MIRRORED IMAGE FILE," which is incorporated herein by reference.

TECHNICAL FIELD

Embodiments of the invention relate generally to an apparatus and method for a selective extraction of information from a mirrored image file.

BACKGROUND

A filesystem in a source storage server can be replicated in a destination storage server. One example for replicating the file system is the SnapMirror® technology which is commercially available from Network Appliance, Incorporated. The SnapMirror technology will transfer all or some of the blocks of the container volume image of the source storage server to the destination storage server. An example of the SnapMirror technology is disclosed in, for example, commonly-assigned U.S. Pat. No. 7,143,307.

A related technology, "snapmirror to tape" (SM2T), allows users to capture the image of the filesystem to a locally attached tape instead of replicating the filesystem to a remote storage server. Optionally, users may store the filesystem image in the form of a file on the local filesystem (in the source storage server) Instead of using a tape. The SM2T image, whether stored on tape or in the form of a file, may be restored on the destination storage server to reconstruct the entire filesystem in its particular state when the SM2T backup was taken. An SM2T image is one example of an image that can be stored in the form of one or more files on a disk. Currently, this is the only way a SM2T backup file can be used. As an example, in order to restore a small 10 KB file, the user may have to restore (on a destination storage server) the entire SM2T backup image which may be multiples of terabytes in size. Not only must the destination storage server have enough storage space to restore the entire filesystem, it must also meet certain configuration requirements, failing which, the restore may not succeed or may proceed extremely slowly. Customers have used Snapmirror-to-tape technology to back up filesystems which contain very large number of files, because a regular filer dump application is typically too slow. However, to restore, e.g., only one file or only a few files, users must restore the entire volume to a destination storage server, and this requirement will require sufficient free disk space in the destination storage server or disadvantageously require current data to be overwritten on the destination storage server. As a result, current approaches are burdensome to users because these approaches require the restoration of the entire filesystem image from a disk to the destination storage server even if a user will only intend to back up, e.g., one or only a few files of the filesystem image, to the destination storage server. Users are currently unable to selectively extract the one or few files of the filesystem image from the disk and copy these one or few files to the destination storage server for purposes of backup. Therefore, the current technology is limited in its capabilities and suffers from at least the above constraints and deficiencies.

SUMMARY OF EMBODIMENTS OF THE INVENTION

An embodiment of the invention provides a method to selectively extract selected information from a mirrored image file on a disk without requiring the user to restore, on the destination storage server, the entire mirrored image file which has the data for a file system. Therefore, an embodiment of the invention permits a user to selectively extract one or more files of the filesystem image from the disk and copy these one or more selected files to the destination storage server for purposes of backup. As a result, a user is no longer required to restore the entire image of the file system from the disk to a destination storage server if the user only intends to copy one or more files of the file system image to the destination server. Although the below examples can be applicable to SM2T images that are stored in and then selectively extracted from a disk, it is understood that the below examples can be applicable to any suitable images that are stored in and then selectively extracted from a disk. Note further that the images that are selectively extracted by methods in accordance with embodiments of the invention are images that are stored on disks and are not stored on tape. The disadvantages of current methods which require an entire image file to be restored on a destination storage server have been previously discussed above. The selected information that are extracted from a disk can be, for example, contents of a file, contents of a directory, other information from the image file. The selected information can be selectively extracted by reading the blocks of the file from the WAFL data structures that has been stored in the image file. An index file is generated and this index file tracks the location of VBNs (virtual block numbers) in an image file so that the user can easily obtain the selected information from disk blocks that are identified by these VBNs, without the requirement of having to restore the entire image file on a memory of a computing device. The VBNs may contain pointers to lower level blocks and data blocks (i.e., "level 0" blocks that contain the actual data for a file).

An embodiment of the invention also provides a method for selectively reading information from a disk, where the location of the information is determined from the index file.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 10A shows an example function that can be performed by the FSInfo class of FIG. 7, as well as other types of base classes that can be used on WAFL data structures, in accordance with an embodiment of the invention.

FIG. 10B shows an example function that can be performed by the FSInfo class of FIG. 7, as well as other types of base classes that can be used on WAFL data structures, in accordance with an embodiment of the invention.

FIG. 10C shows an example function that can be performed by the FSInfo class of FIG. 7, as well as other types of base classes that can be used on WAFL data structures, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides a method to extract selected information from an image file, selectively without requiring the user to restore, on the destination storage server, the image file which has the data for a file system. The disadvantages of current methods which require an image file to be restored on a destination storage server have been previously discussed above. The selected information can be, for example, contents of a file, contents of a directory, and/or other information from the image file. The selected information can be selectively extracted by reading the blocks of the file from the WAFL data structures that has been stored in the image file. An index file is generated and this index file tracks the location of VBNs (virtual block numbers) in an image file so that the user can easily obtain the selected information from disk blocks that are identified by these VBNs, without the requirement of having to restore the entire image file on a memory of a computing device. The VBNs may contain pointers to lower level blocks and data blocks (i.e., "level 0" blocks that contain the actual data for a file).

An embodiment of the invention also provides a method for selectively reading information from a disk, where the location of the information is determined from the index file.

Figure 1:
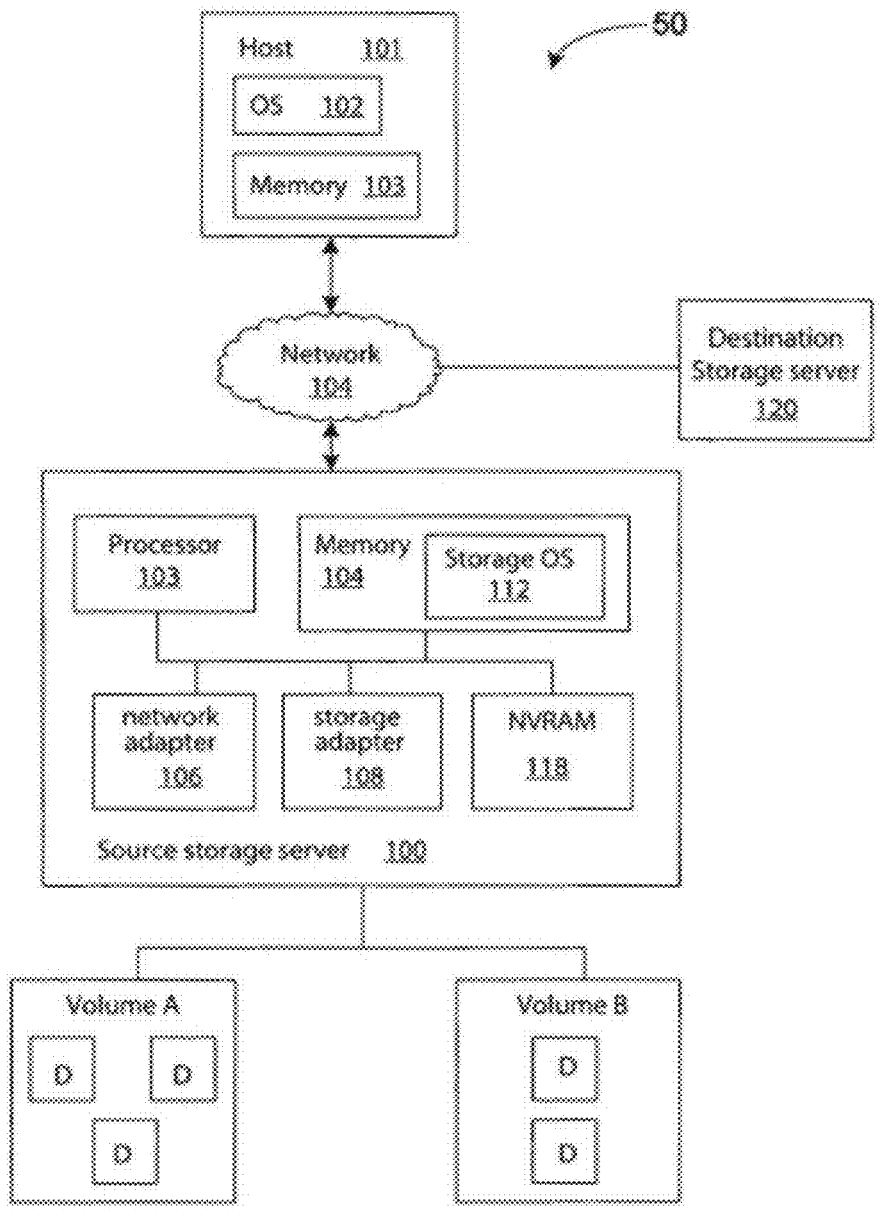
FIG. 1 is a block diagram of an apparatus (system) that can be used in an embodiment of the invention.

FIG. 1 is a block diagram of a system 50 including a storage server 100 that can be used in an embodiment of the invention. A storage server (or storage appliance) is a computer that provides service relating to the organization or storage of information on storage devices, such as disks. Examples of currently available storage server products and associated software components are commercially available from, for example, NETWORK APPLIANCE, INC., Sunnyvale, Calif. or other vendors. In addition, it will be understood to those skilled in the art that the embodiments of the invention described herein may also be used in any type of special-purpose computer (e.g., server) or general-purpose computer, including a stand-alone computer, embodied as a storage server. Moreover, the teachings of the embodiments of the invention can also be adapted to a variety of storage server architectures including, but not limited to, a network-attached storage environment, or a storage area network and disk assembly directly-attached to a client/host computer. The term "storage server" or "file server" should therefore be taken broadly to include such arrangements.

The storage server 100 includes a processor 103, a memory 104, a network adapter 106 and a storage adapter 108 interconnected by a system bus 110. The storage server 100 also includes a storage operating system 112 that implements a file system to logically organize the information as a hierarchical structure of directories and files on a disk. Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage server 100. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage system by inter-alfa invoking storage operations in support of the services that are implemented by the storage system. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage server 100 to a client over the computer network or connecting the storage server 100 to other storage servers.

The storage adapter 108 cooperates with the storage operating system 112 in order to access information requested by a client. The information may be stored in a number of storage volumes (e.g., Volume A and Volume B).

The number of storage volumes may vary. Each storage volume is constructed from an array of physical disks D that are typically organized as RAID disk groups. The RAID disk groups include independent physical disks including those storing a striped data and those storing separate parity data. The number of disks in a storage volume and in a RAID disk group may vary.

The storage adapter 108 includes input/output interface circuitry that couples to the disks over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the client 105.

To facilitate access to the disks, the storage operating system 112 typically implements a file system that logically organizes the information as a hierarchical structure of directories in files on the disks. Each file on a disk may be implemented as a set of disk blocks configured to store information such as text or other format. The directory may be implemented as a formatted file that contains pointers to other files and directories (i.e., information on how to find other files and directories). The storage operating system 112 associated with each volume is, for example, the Data ONTAP® storage operating system which is commercially available from NETWORK APPLIANCE, INC. The Data ONTAP® storage operating system implements a Write Anywhere File Layout (WAFL)® file system. However, it is expressly contemplated that the principles of embodiments of this invention can be implemented using a variety of alternate storage operating system architectures. Additional details on the functions of the storage operating system 112 is disclosed in, for example, commonly-assigned U.S. patent application Ser. Nos. 10/836,817 and 10/836,090. Additional details on the WAFL file system is disclosed in, for example, commonly-assigned U.S. Pat. No. 6,289,356.

Figure 2A:
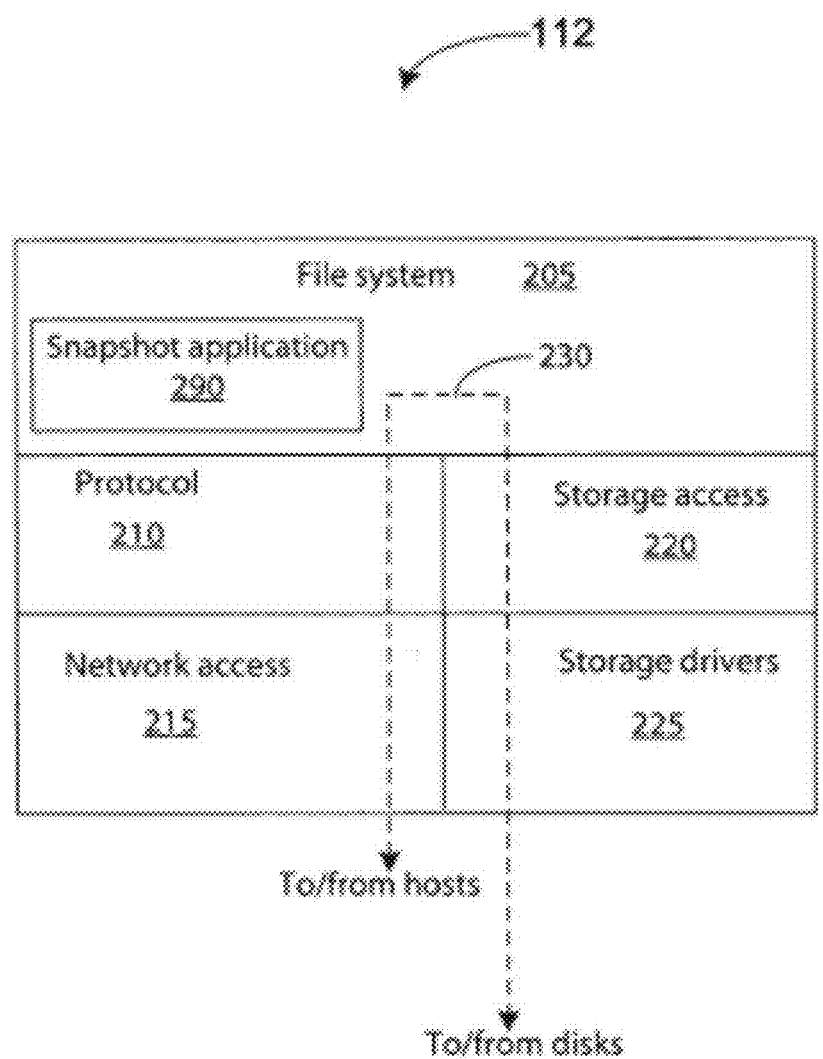
FIG. 2A is a block diagram of a storage operating system that can be used in an embodiment of the invention.

FIG. 2A is a schematic block diagram of an example storage operating system 112 that may be advantageously used in an embodiment of the invention. As shown, a storage operating system. 112 includes several modules, or "layers". These layers include a file system 205. The file system 205 is application-layer software that keeps track of the directory structure (hierarchy) of the data stored in a storage subsystem and manages read/write operations on the data (i.e., executes read/write operations on the disks in response to client requests). The operating system 112 also includes a protocol layer 210 and an associated network access layer 215, to allow a storage appliance to communicate to devices in a network, such as the host 110. The protocol 210 layer implements one or more of various higher-level network protocols, such as, for example, Network File System (NFS), Common Internet File System (CIFS), Hypertext Transfer Protocol (HTTP) and/or Transmission Control Protocol/Internet Protocol (TCP/IP), which are network protocols that are known to those skilled in the art. The network access layer 215 includes one or more drivers that implement one or more lower-level protocols to communicate over the network, such as Ethernet. The network access layer 215 may incorporate one or more interfaces 235 that receive input commands from a user.

The storage operating system 112 also includes a storage access layer 220 and an associated storage driver layer 225, to allow a storage appliance to communicate with a storage subsystem. The storage access layer 220 implements a higher-level disk storage protocol, such as RAID, while the storage driver layer 225 implements a lower-level storage device access protocol, such as Fibre Channel Protocol (FCP) or SCSI, which are protocols that are known to those skilled in the art. Also shown in FIG. 2A is path 230 which represents the data flow through the storage operating system 112 associated with a read or write operation.

As used herein, the term "storage operating system" generally refers to the computer-executable code operable to perform a storage function in a storage appliance, e.g., that manages data access and may, in the case of a file server, implement file system semantics. In this sense, the Data ONTAP® software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described, herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" should therefore be taken broadly to include such arrangements in addition to any subsystems configured to perform a storage function and associated with other equipment or systems.

A persistent point-in-time image (PPTI) application 290 is typically part of the file system. This application 290 is responsible (on the source side storage server) for the scanning a PPTI (e.g., snapshot) from the source storage server. A PPTI is an image of the file system in a storage server at a point in time. A PPTI can also include other information (metadata) about the file system at the particular point in time during which the image is taken. Additional details of the application 290 are described in, for example, commonly-assigned U.S. Pat. No. 6,993,539. One example of a persistent point-in-time image (PPTI) is known as a Snapshot@ which is a registered trademark of Network Appliance, Inc.

For purposes of background information and to assist in the below discussion of embodiments of the invention, a discussion is first presented below on the WAFL data structure which can be used in an embodiment of the invention. The WAFL data structure is first discussed to assist in describing an embodiment of the invention. The WAFL data structure is well known to those skilled in the art and is discussed in detail in, for example, commonly-assigned U.S. Pat. No. 6,289,356. Enhancements to the features of the WAFL data structure is discussed in the above-cited commonly-assigned U.S. patent application Ser. No. 10/836,817. Modifications in the WAFL data structure format are found in, for example, later versions of the Data ONTAP storage operating system which is commercially available from Network Appliance, Inc.

All blocks of a file system belong to blocks of a particular RAID system or a disk. As known to those skilled in the art, a RAID subsystem will cause a number of disks to appear as a single physical disk.

Disk blocks within a volume are called volume blocks. Each volume block has a number which is known as a volume block number (VBN). Therefore, a VBN corresponds to a particular disk block.

In the WAFL format, VBN1 and VBN2 contain a "VBN-Info" structure. The VBNInfo structure contains, among other data, a pointer to a "FSInfo" structure. The term "VBNInfo" structure (VBN information structure) can broadly defined herein as any data structure that contains a pointer to the FSInfo structure. In turn, an FSinfo structure (file system information structure) can be broadly defined herein as any data structure represents a given persistent-point-in-time image (PPTI) (e.g., a given snapshot) of a file system. The FSInfo structure includes a root node of the file system for a particular PPTI and metadata associated with the file system for the particular PPTI. There is one FSinfo structure for every persistent point-in-time image (PPTI) (e.g., snapshot) that is present in a volume. Each FSinfo structure contains the inode for the inode file (root node) for a particular PPTI. Each inode file contains the modes for all files in that particular PPTI in a file system. Once the inode file is obtained, it is possible to access the inode structure of any inode for a given inode number. In general, most file systems generate an inode number for an inode (or a structure that is equivalent to an mode).

Figure 2B:
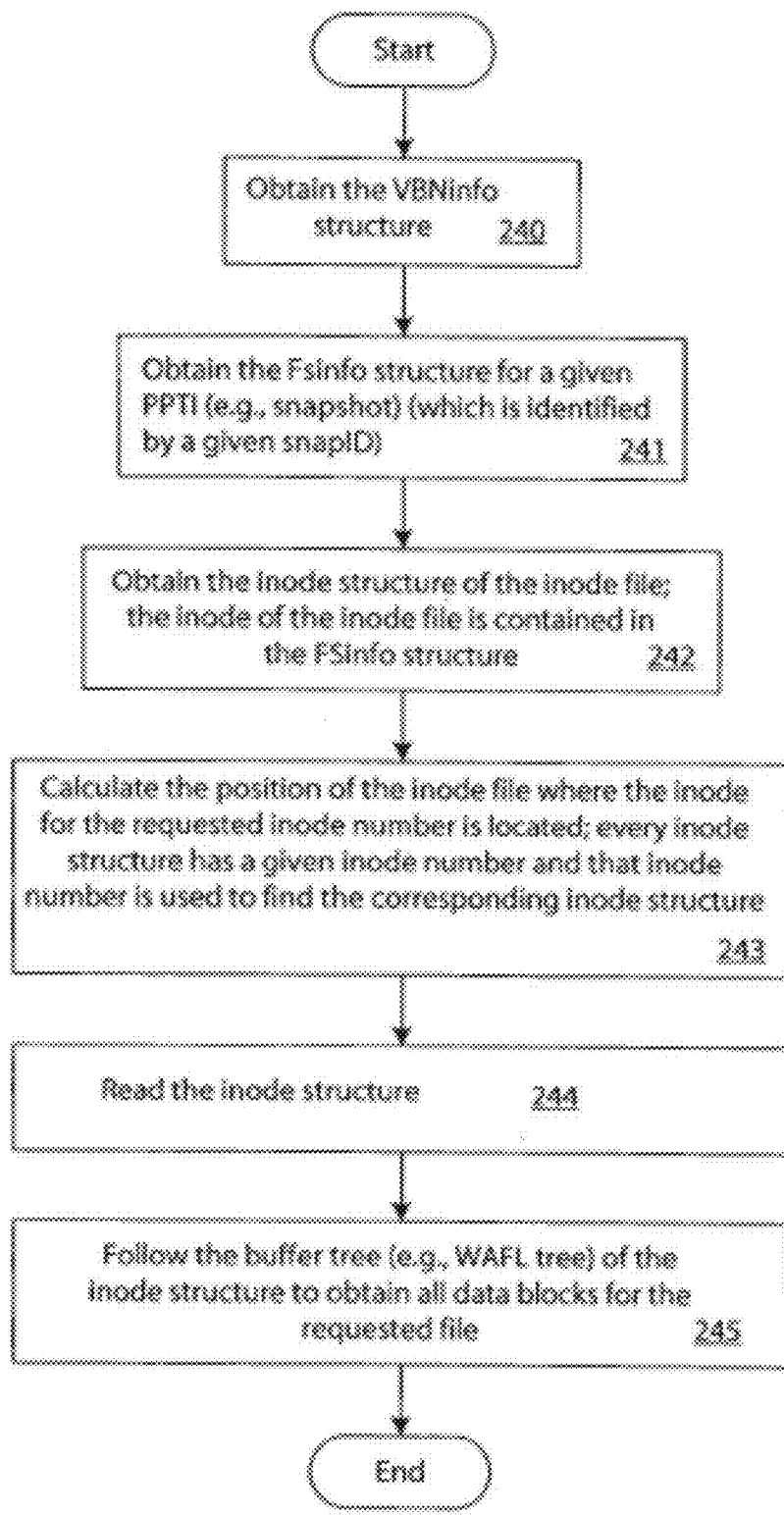
FIG. 2B is a flow chart that illustrates a method of extracting the contents of a file, shown for purposes of providing a background to an embodiment of the invention.

Files in WAFL are structured in a hierarchical tree fashion, with the inode structure containing top level VBNs. The blocks pointed to by these VBNs in turn contain pointers to lower level blocks and data blocks (i.e., "level 0" blocks). The data blocks contain the actual data for a file. The details of the WAFL tree structure are disclosed in the above cited U.S. Pat. No. 6,289,356 and U.S. patent application Ser. No. 10/836,817. Therefore, in order to extract the contents of a file, the following steps (also illustrated in FIG. 2B) are followed by the file system as listed below. The steps indicate how the contents of a requested file are extracted by use of a VBN. In an embodiment of the invention, to be later discussed below, these steps can be used to extract the contents of a file on a disk by use of a VBN. The following steps are performed in order to extract the contents of a file:

(1) obtain the VBNInfo structure (block 240). A VBN will contain the VBNInfo structure. As an example, in a WAFL file system, the top level VBNs (e.g., VBN1 and VBN2) will contain the VBNInfo structure as mentioned above.

(2) Obtain the FSinfo structure for a given PPTI (e.g., snapshot) (which is identified by a given snapID) (see block 241). Note that snapID can be broadly defined as any identifier for a given PPTI.

(3) Obtain the mode structure of the inode file; the inode of the inode file is contained in the FSinfo structure (block 242).

(4) Calculate the position of the inode file where the inode for the requested inode number is located; every inode structure has a given inode number and that inode number is used to find the corresponding inode structure (block 243).

(5) Read the inode structure (block 244).

(6) Follow the buffer tree (e.g., WAFL tree) of the mode structure to obtain all data blocks for the requested file (block 245).

An inode file is a regular file. Every inode in an inode file can be a regular file type, directory type, or other types (e.g., symbolic link, stream directory, etc.). The data blocks (level 0 blocks) of the regular file-type inode contain the actual file data. The data blocks (level 0 blocks) of directory-type inodes contain directory entry data. Each directory entry data are the names of the directory entries and the corresponding inode numbers. Listing of the contents of a directory involves obtaining all data blocks (level 0 blocks) for a directory inode and iterating and printing all directory entries.

The WAFL file system also allows for a separate directory tree structure that is called a meta directory (metadir). A meta directory is a directory tree structure that is parallel to the main directory tree structure. The meta directory is usually not visible to a user, and is used for storing files that are used for internal processing by the file system.

An inode contains information about a file such as, for example, the file type, file size, file modification data, permissions, access control list (ACL) inode, and inode of stream directory.

As discussed above, Snapmirror is a technology used to replicate a file system on a source storage server to a destination storage server by transferring all or some blocks of the container volume image of the source to the destination. A related technology, "snapmirror to tape" (SM2T), allows users to capture the image of the file system on the source server to a locally attached tape instead of replicating the file system to a remote or destination storage appliance. Optionally, users may store the local file system image as SM2T image (in the form of a file) via disk instead of using tape. Note that embodiments of the invention do not apply to the case when information is extracted from a tape. The SM2T image, whether stored on tape or in the form of a file may be restored on the destination storage appliance to reconstruct the entire file system exactly the way it was when the SM2T backup was taken. Currently, this is the only way a SM2T backup file can be used. For example, in order to restore a small 10 KB file, the user may have to restore the entire SM2T image which may be multiples of terabytes in size. Not only must the destination storage server have enough storage space to restore the entire file system, but the destination storage server must also meet certain configuration requirements, failing which, the restore may not succeed or may proceed extremely slowly.

An embodiment of the invention provides a method to extract selected information from an image file selectively on a disk without requiring the user to restore, on the destination storage server, the entire volume (that contains the data for a file system. Note that embodiments of this invention applies only to images in the form of files on disk, not SM2T files that are stored on tape. In such cases, it will be selected and feasible to have the ability to selectively extract certain information such as, for example, contents of a file or browse the content of a directory or obtain other information from the image file. The information can be selectively extracted by reading the blocks of the file from the WAFL data structures that has been stored in the image file.

Figure 3:
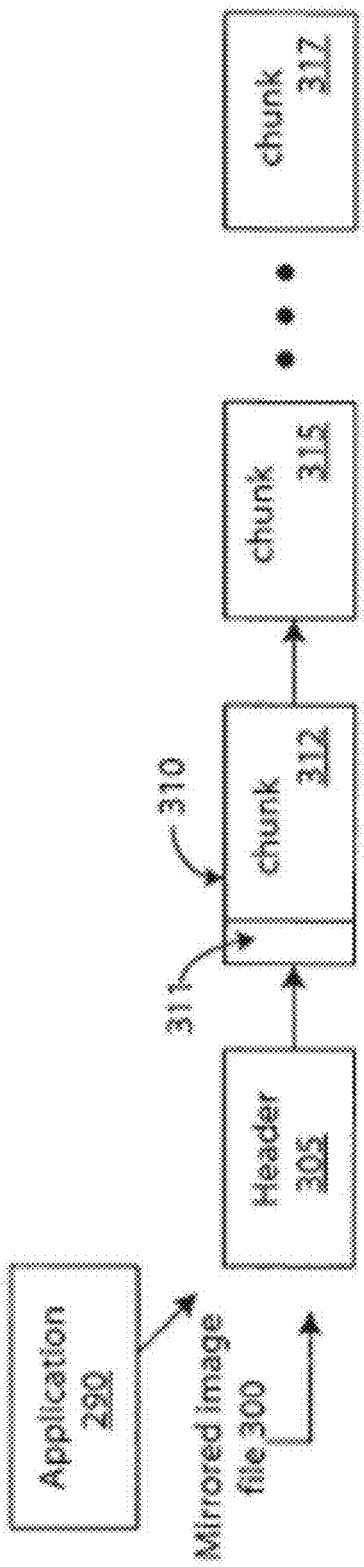
FIGS. 3 and 4 are block diagrams that illustrate the data structure for an image file that can be used in an embodiment of the invention.
Figure 4:
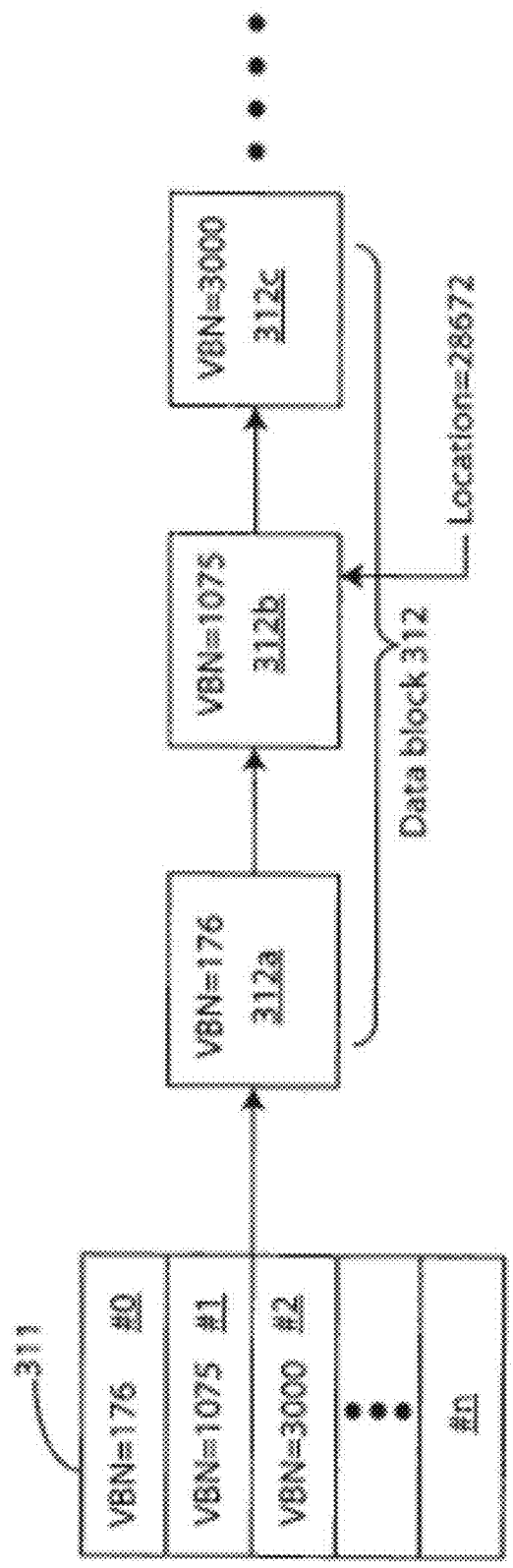

For purposes of background, the format of a mirrored image file 300 on a disk is first discussed. One example of the image file is an SM2T file, although embodiments of the invention are also applicable to other suitable types of images that are stored in and can be selectively extracted from disks. FIGS. 3 and 4 are block diagrams that illustrate the data structure for a mirrored image file 300. The application 290 (FIGS. 2A and 3) can capture an image of the file system and store the image as a mirrored image file 300 in disk. The image file can be created in a storage appliance but can also be copied to a disk (e.g., CD-ROM). Additional background details on an image file were also discussed in the paragraphs above. The image file has all blocks in the file system. An embodiment of the invention permits retrieval of data of the file system from the image file 300, without the previous requirement of having to first restore the entire image file 300 on another storage appliance, by use of an index file as will be described below.

The image file 300 includes a header 305 and one or more "chunks" (e.g., chunks 310 and 315 in the FIG. 3 example). A chunk includes a chunk header followed by up to, for example, 512 blocks of data. For example, chunk 310 includes chunk header 311 and data blocks 312. One data block is, for example, typically 4 KB in size. However, a data block may be at other sizes.

A chunk header is an array of structures containing, among other information, the Volume Block Numbers (VBN the corresponding data blocks that follow. A chunk header block 311 has the VBN numbers. For example, structure #1 (FIG. 4) in the chunk header 311 refers to VBN 1075 (where the structures in the chunk header 311 are numbered from #0 to # n where n is a suitable integer); this means the second block 312b in the data blocks 312 is Volume Block Number 1075. As another example, since structure #2 (FIG. 4) in the chunk header 311 refers to VBN 3000, then this means the third block 312c in the data blocks 312 is Volume Block Number 3000. Note that if the structures in the header 311 begins at #1 instead of #0, then the corresponding blocks in the data blocks 312 will be at the same position number as the structure number (i.e., structure #1 will correspond to the first block in the data blocks 312). The order of VBNs present in a chunk may be arranged in a random manner on a disk and VBNs are placed throughout the image file in an order that is typically non-sequential or random. Therefore, if a user wishes to obtain, for example, VBN 1075 from a mirrored image file 300, the user may not be able to locate VBN 1075 because of the random placement, of the VBNs in the image file. As will be discussed below, an embodiment of the invention provides a method of creating an index file that tracks the location of VBNs in an image file so that the user can easily obtain the VBNs.

As also mentioned above, each data block in chunk is typically implemented as, for example, 4 kilobytes in size, but other data sizes may be alternatively used In the case of flexvols which is used in an extension of the WAFL file system as disclosed in the above-cited commonly-assigned U.S. patent application Ser. No. 10/836,817, VVBN (virtual block number) are used instead of VBNs in an image file 300. A flexvol is a volume that has access to a pool of physical storage and that can be sized and resized quickly and dynamically as application requirements change. Additional details on flexvols are discussed in the above-cited U.S. patent application Ser. No. 10/836,817. An underlying physical volume is an aggregate that is formed by one or more groups of disks, such as RAID groups, of the storage system, and the aggregate may include one or more files, wherein each file contains a flexvol and wherein the sum of the storage space consumed by the flexvols is physically smaller than (or equal to) the size of the overall physical volume.

The data in an image file 300 describes a file system (e.g., n the WAFL format) and as disclosed in, for example, the above-cited commonly-assigned U.S. Pat. No. 6,289,356. As discussed above, VBN1 and VBN2 contain a "VBNInfo" structure which contains, among other data, a pointer to the "FSInfo" structure. There is one FSInfo structure for every PPTI present in a volume. Therefore, given a snapID of a PPTI and the VBNInfo structure (which is in VBN1 and VBN2), the corresponding FSInfo block is obtained. The FSInfo block has, among other data, information to obtain the inode file of the volume. Once the inode file is obtained, it is possible to access the inode structure of any inode for a given inode number.

In order to traverse the buffer tree of the inode structure, a number of VBN lookups are performed. A VBN lookup is the process of obtaining a WAFL disk block given its Volume Block Number. In storage appliances this task is achieved by the RAID or storage subsystems. In a mirrored image file 300 (such as, e.g., an SM2T file or other mirrored image files), WAFL disk blocks may be located (placed) in completely random fashion on a disk as mentioned above. Therefore there is currently no direct way to perform a VBN lookup in an image file. To resolve this problem, an embodiment of the invention provides a method to generate a VBN index file for the image file. An example VBN index file is generated and shown as index file 500 in FIG. 5A, in accordance with an embodiment of the invention. This generation of an index file is typically a one time activity that is typically performed when the user wants to extract selected or desired information from the image file 300. Once an index file 500 is generated, the index file 500 can be used for all the below-discussed commands in embodiment of the invention to obtain selected information from an image file 300. Therefore, the index file 500 is used to extract selected information from an image file 300 for eventual backup of the extracted information to a destination storage serve without the prior requirement of restoring the entire image file 300 to the destination storage server.

The index file includes a number of entries that indicate the VBN location for every VBN in an image chunk. The first 4096 bytes of the index file is typically reserved for versioning and other metadata.

In an embodiment of the invention, an offset of every index file entry (in an index file) is computed by equation (1) below:

$$\text{offset}=4096+(VBN*4) \tag{1}$$

Therefore, for structure #1 (VBN=1075) in FIG. 4, the following calculation is performed with equation (1):

$$\text{offset}=4096+(VBN*4)=4096+(1075*4)=8396. \tag{2}$$

A "File Block Number" (FBN) is a logical block number of a file. The file is divided into the multiple FBNs. In the WAFL file system, each FBN is 4 KB (4096 bytes). For a file, the first 4 KB is FBN 0, and the next 4 KB is FBN 1, and so forth.

Since this structure #1 is the second entry in the chunk header 311 (of chunk 310), VBN=1075 (in structure #1) is at FBN 5+FBN 2=FBN 7, assuming that, for example, the image chunk 310 starts at 20480 as the FBN 5 location in the image file 300. Therefore, the disk location in the disk of VBN=1075 is FBN=7. For structure #2, VBN=3000 is at FBN 5+FBN 3=FBN 8, if image chunk 310 starts at 20480 as the FBN 5 location in the image file 300. Note that the image chunk 310 can start at other FBN values (e.g., FBN 0) in other examples. Note also that the above example starting value 20480 for FBN 5 is determined by multiplying 5 (for FBN 5) with the 4096 offset value (i.e., 20480=5*1075). This starting value 20480 is the starting location of chunk 310 in the image file 300. The reader thread 525 reads the VBN 1075 value from the FBN=7 location of the image file 300, and calculates the offset=8396 value based on equation (1). The value FBN=7 is written by the writer thread 530 (of an index file creator application 520 of FIG. 5A) to offset 8396 in the index file 500 (see FIG. 6). Therefore, equation (1) above will indicate a location in the index file 500 for writing an FBN value for a given VBN in an image file 300. The reader thread 525 (FIG. 5A) records a VBN value (e.g., VBN 1075) for a given FBN value (FBN=7). In this example, reader thread 525 uses equation (1) to determine a location at offset=8396 for VBN 1075, and a writer thread 530 will store at offset=8396 (a location in index file 500) the FBN=7 value.

Figure 9:
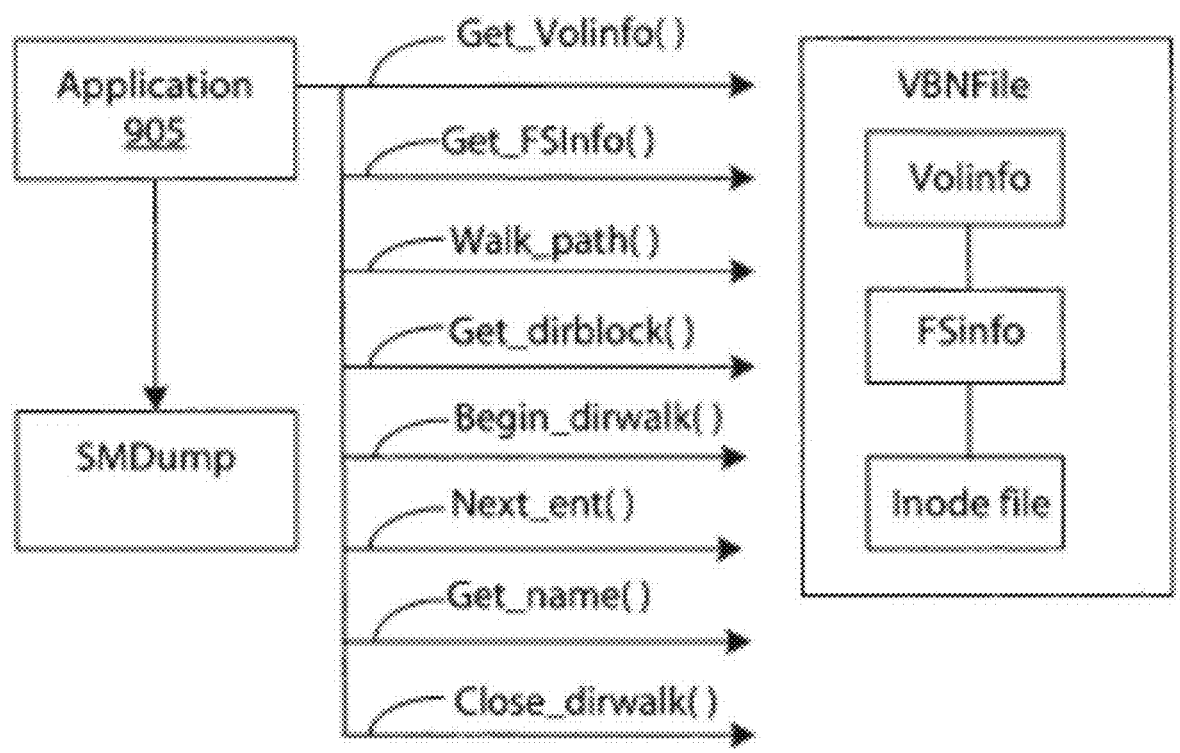
FIG. 9 is a block diagram of a software application in accordance with an embodiment of the invention.

When traversing the WAFL buffer tree in the image file 300 at a subsequent time, if a user wishes to extract VBN=1075 from the image file 30, then the user can use the extraction application 905 (FIG. 9) which uses equation (1) to obtain the offset=8396 (see FIG. 6) in the index file 500. From this offset=8396 location in the index file 500, the application 905 permits the user to read the FBN value of FBN=7. The location of FBN=7 is then found within the image file 300, by the application 905, by multiplying the FBN=7 value with the 4096 offset value or 7*4096=28672 (see FIG. 6). This location 28672 (in image file 300) will contain VBN 1075 which the user is seeking to extract in this example. The user can then extract or view the information that corresponds to this VBN 1075, at location 28672, by use of the application 905 (FIG. 9). This software application 905 can use known routines (e.g., the method of FIG. 2B) for viewing information in a data block that is identified by a VBN number, in an image file 300.

Note that the above formula of equation (1) assumes a 32 bit VBN. For a 64 bit VBN, the parameter "4" in the equation above is changed to "8".

Figure 5A:
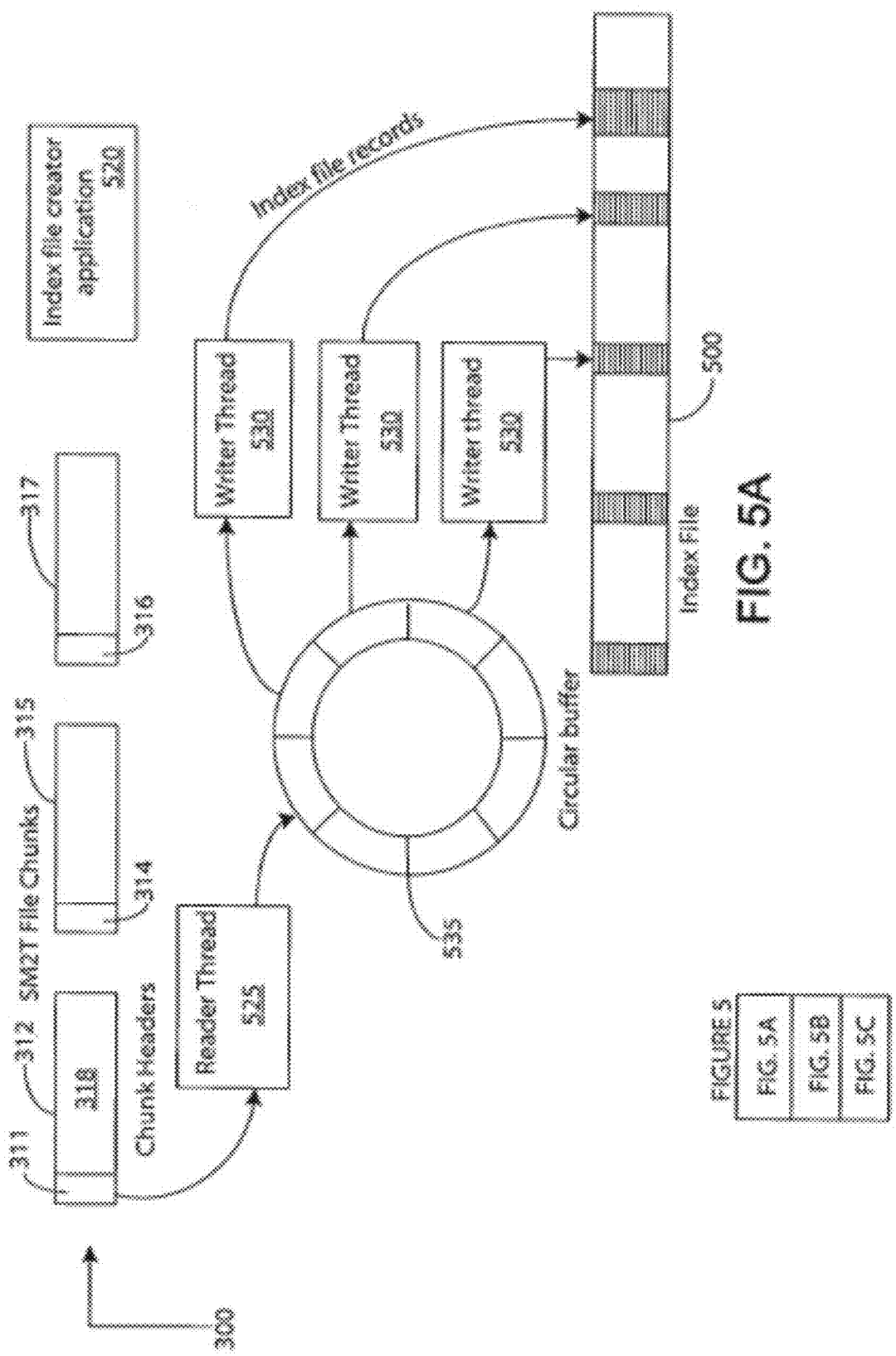
FIG. 5A is a block diagram of a subsystem for creating an index file, in accordance with an embodiment of the invention.
Figure 6:
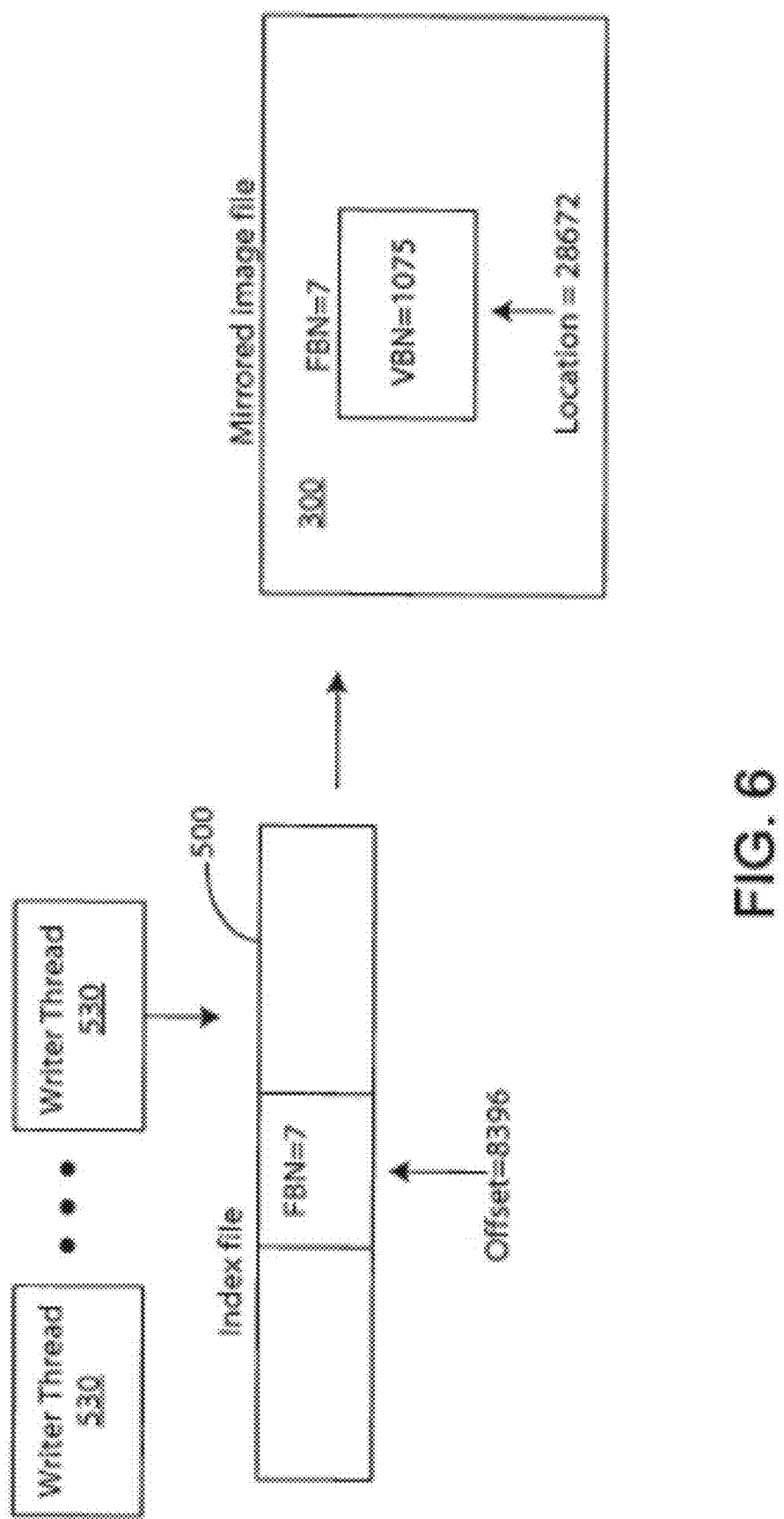
FIG. 6 is a block diagram that illustrates the relationship between an FBI value in an index file and a VBN in an image file, in accordance with an embodiment of the invention.

FIG. 5A is a block diagram of a subsystem that illustrates the elements for creating an index file 500 and that illustrates the steps performed by an index file creator application 520 in accordance with an embodiment of the invention. The application 520 includes a reader software thread 525 and writer software threads 530 that are shown separately from the application 520 to assist in explaining the operation performed by the application 520. As discussed below, the index file creator application 520 creates an index file 500 that permits the extraction of information desired by a user from an image file (e.g., image file 300). As a result, the user can extract information from the image file and store this information to a destination storage server or another computing device e.g., laptop computer or PC), without the prior requirement of having to store the entire volume in the image file into the destination storage appliance. An embodiment of the invention applies only to image files that are stored as files in, e.g., a disk or other suitable storage device type, and not to SM2T images that are stored on tape.

The index file creator application 520 can run on top of the storage OS 112 in a storage server 100 (filer) or on top of an operating system (e.g., open system environment such as, for example, Linux OS or Windows OS) 102 in a host computer 101 (FIG. 1) that communicates with the storage appliance 100 via network 104.

Note that in order for the storage operating system to traverse the WAFL buffer tree in a storage appliance, the storage operating system is required to perform a number of VBN lookups. A VBN lookup is the process of obtaining a WAFL disk block given its Volume Block Number.

As shown in FIG. 5A, as an example, the application 520 generates an index file 500. The reader thread 525 of the application 520 reads a chunk header in an image chunk in an image file 300, while the writer threads 530 are writing to the index file 500. The reader thread 525 and writer threads 530 are processes that typically run in parallel. In the example of FIG. 5A, file 300 includes the image file chunks 312, 315, and 317 (also shown in FIG. 3) with chunk headers 311, 314, and 316, respectively. The reader thread 525 records the VBN numbers in every image file chunks (e.g., chunks 312, 315, 317). For example, the reader thread 525 records the VBN numbers (e.g., see VBN numbers 176, 1075, 3000 in FIG. 4) for the chunk header 311 of image file chunk 312. The reader thread 525 records the other VBN numbers in the chunk headers 314 and 316 in the other chunks as well. The reader and writer threads in FIG. 5A are tasks in an application. 520 that can run on top of the storage OS 112 in a storage server 100 (filer) or on top of an operating system (Linux OS or Windows OS) 102 (FIG. 1) in a computer 101.

Since image files may be large, sometimes running into terabytes, generation of the index file 500 may take a long time it is advantageous to optimize performance of the index file generating tool 520. Therefore, an embodiment of the invention achieves optimal index file generation by optional use of multithreading via multiple writer threads 530 (FIG. 5A) in order to achieve optimal index file generation speed.

The index file 500 can be generated in its entirety by reading only the chunk headers in the image file 300. There is no need to read all the WAFL data blocks in the image file 300, and this increases in the optimal index file generation speed. The reader thread 525 reads the chunk header blocks 311, 314, and 316 (in chunks 312, 315, and 317, respectively). In an embodiment of the invention, the reader thread 505 places the data that are read in the header blocks into a circular buffer 535, and wakes up all other writer threads 530. After the reader thread 525 reads the header 311, the reader thread 525 then skips the next 512 data blocks (data blocks 318 in file chunk 312) and then repeats the procedure with the next chunk header 314 in file chunk 315 and with any successive chunks.

A writer thread 530 checks if the circular buffer 535 is empty. If the buffer 535 is empty, then the writer thread waits (i.e., is in a sleep state) until the reader thread 525 wakes up any of the writer threads. Software threads wakeup calls may be used to wake up the writer threads and are methods that are known to those skilled in the art. When awakened or is awake, a writer thread 530 removes one chunk header from the circular buffer 535, wakes up the reader thread 525, and processes the chunk header. The process is repeated until no more chunk headers remain to be processed in the buffer 535. The reader thread 525 keeps reading chunk headers in the file 300 until the circular buffer 535 is full. If the circular buffer is full, the reader thread 525 will go to sleep until awakened by one of the writer threads 530.

Since there are typically 512 VBN entries in each chunk header, the threads will typically issue 512 I/O requests per chunk header block. However, the reader thread will typically have to execute only one I/O request of 4096 bytes to read one chunk header. Therefore, the writer threads will typically always be significantly slower than the reader threads, and under normal circumstances there will not be a situation where one or more writer threads are waiting for the reader thread to supply data for processing. Generally, for example, 5 to writer threads are sufficient to ensure maximum speed of processing.

The circular buffer 535 are typically protected from concurrent access by use of, for example, mutex locks for guarding shared resources as known to those skilled in the art. There is no need to lock the output index file 500 at any time, even though multiple threads 530 are updating that file 500, concurrently. This is because a VBN value can appear only once in an image file 300, and each record in the index file 500 will be written only once. Therefore, multiple writer threads 530 can always concurrently update different parts of the output index file 500.

As an additional and optional optimization, writer threads 530 can buffer up contiguous index file records, and flush them with one I/O operation when an output buffer (that is in each writer thread or associated with the writer thread) fills up, or a non-contiguous record needs to be written.

The above-discussed index file 500 generating process terminates when all of the chunk headers in the image file has been processed by the writer threads. Additional details on the operation of the reader thread and the writer threads are shown in FIGS. 5B and 5C, respectively.

Figure 5B:
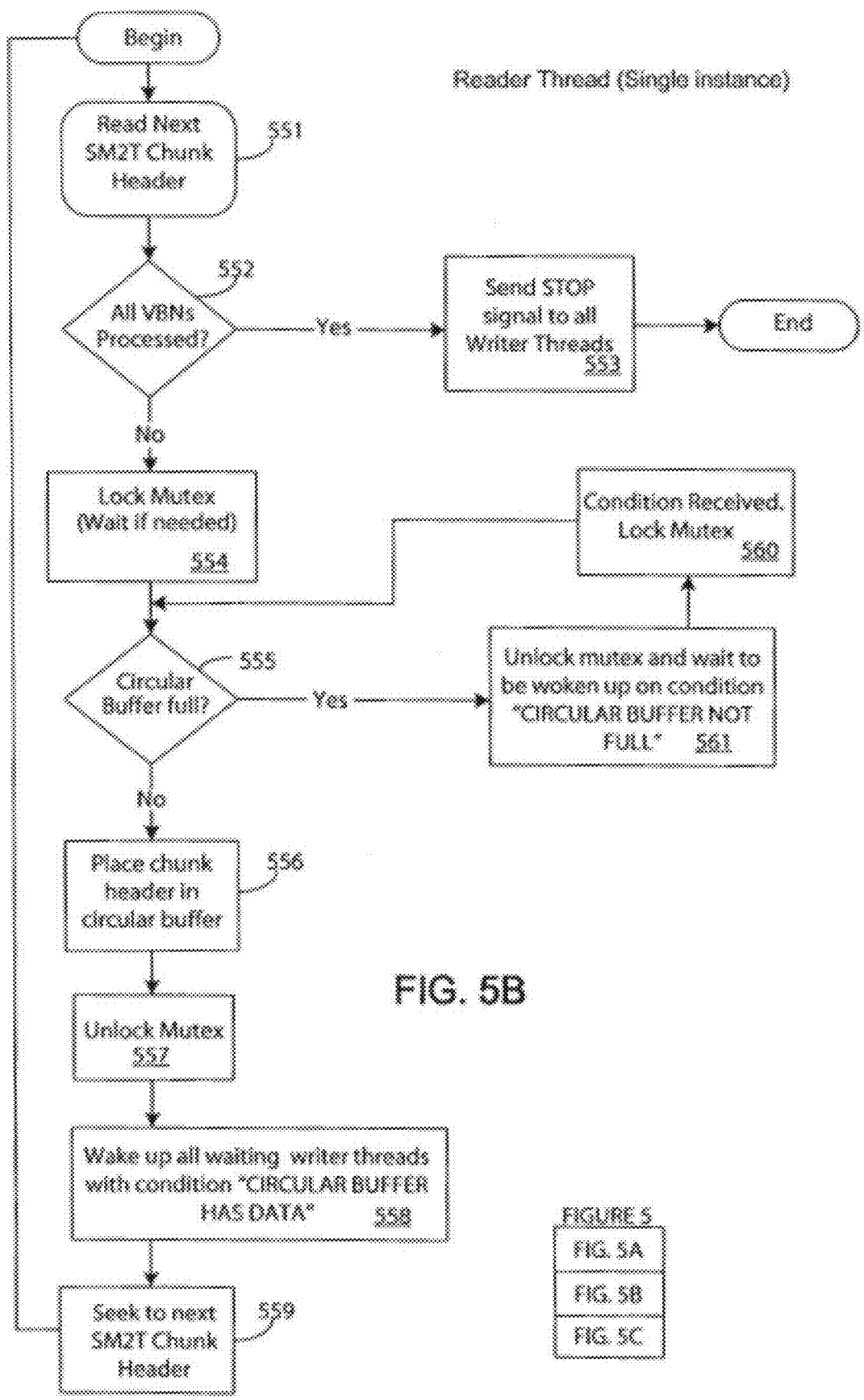
FIG. 5B is a flow chart of an operation of a single instance of a reader thread, in accordance with an embodiment of the invention.
Figure 5C:
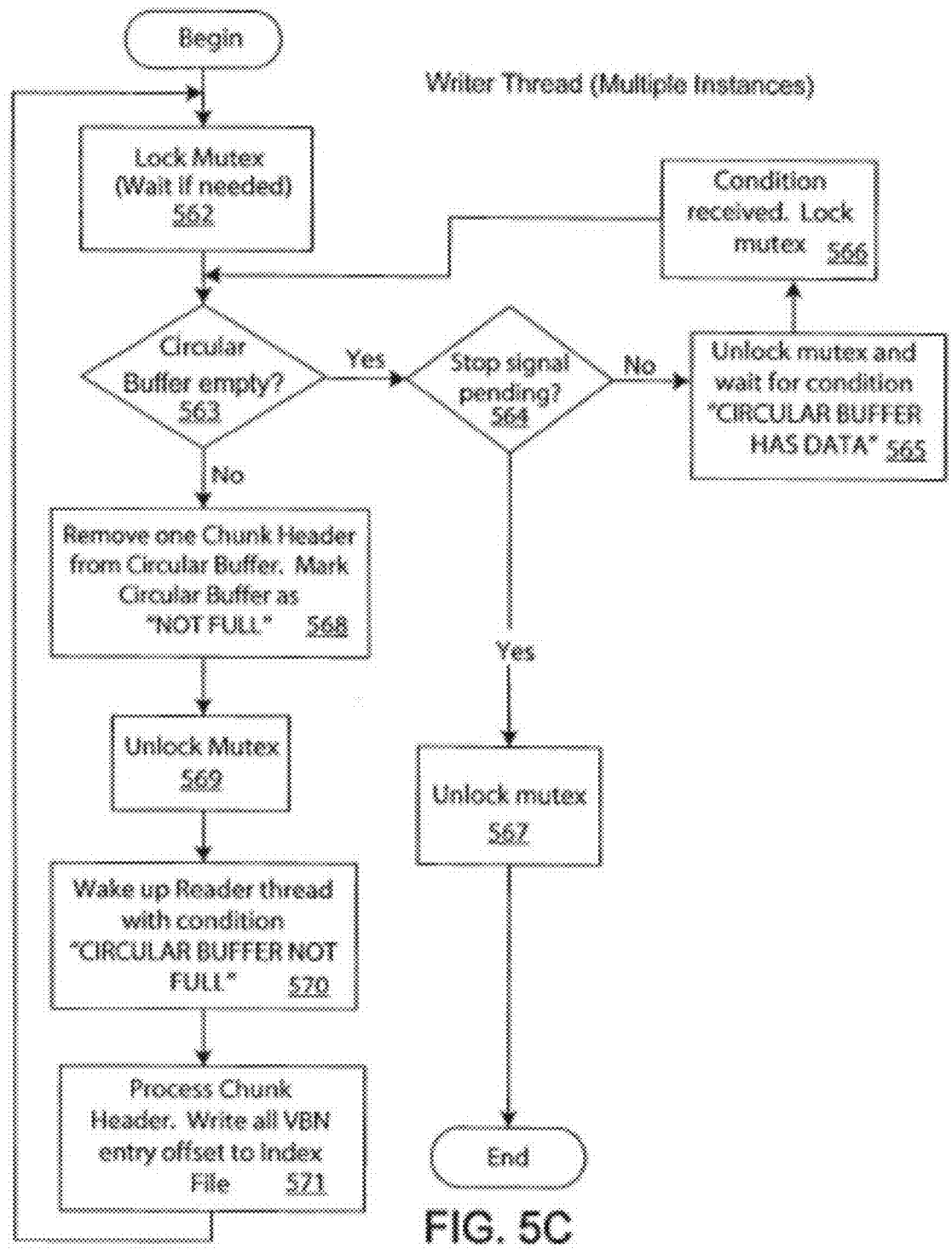
FIG. 5C is a flow chart of an operation of a writer thread which can be multiple instances, in accordance with an embodiment of the invention.

FIG. 5B is a flow chart of an operation of a single instance of a reader thread, in accordance with an embodiment of the invention. In block 551, the thread reads the next image chunk header. In block 552, if all VBNs have been processed, then the reader thread in block 553 sends a stop signal to all writer threads to stop writing to the index file 500.

In block 552, if all VBNs have not been processed, then in block 554, the thread locks (obtains) the mutex lock in order to access the circular buffer and will wait for the mutex lock if required.

In block 555, if the circular buffer is full, then in block 561 the thread unlocks (releases) the mutex lock and will wait to be woken up on the condition when the circular buffer is not full (no longer full). Note that the various conditions in FIGS. 5B and 5C are wakeup signals that are sent by a thread and received by the appropriate thread. In block 561, when the circular buffer not full condition is received by the thread, then in block 560 the thread will lock the mutex lock, and repeats the steps starting from block 555.

If in block 555 the circular buffer is not full, then in block 556 the thread will place a chunk header in the circular buffer. In block 557, the thread will unlock the mutex lock.

In block 558, the thread will wake up all waiting writer threads with the condition that the circular buffer has data. In block 559, the thread will read the next image chunk header.

FIG. 5C is a flow chart of an operation of a writer thread, which could be multiple instances, in accordance with an embodiment of the invention.

In block 562, a writer thread will lock the mutex lock and wait for the mutex lock if required.

In block 563, if the circular buffer is empty, then in block 564, the thread determines if a stop signal from the reader thread is pending. If so, then in block 567, the thread unlocks the mutex lock and the process in FIG. 5C terminates. If a stop signal is not pending, then in block 565 the thread unlocks the mutex lock and waits for the condition that the circular buffer has data. In block 566, when the thread receives that condition, the thread will lock the mutex lock, and repeats the steps starting from block 563.

In block 563, if the circular buffer is not empty, then in block 568 the thread will remove one chunk header from the circular buffer and mark the circular buffer as not full.

In block 569, the thread will unlock the mutex lock.

In block 570, the thread will wake up the reader thread with the condition that the circular buffer is not full.

In block 571, the thread will process the chunk the chunk header and write all VBN entry offset to the index file.

Note that when a thread (reader or writer) sleeps on a condition (noted in FIGS. 5B and 5C), using a locked mutex lock, the thread will automatically unlock the mutex lock. Once the thread has woken up on the specific condition that it is waiting for, the thread will lock the mutex lock. If the mutex lock, is already locked by another thread, the thread will sleep until the mutex lock is unlocked by that other thread.

An embodiment of the invention can be implemented by use of Object Oriented techniques and methodology and use, e.g., the C++ programming language or other suitable programming language. For example, the data structure in the file system that is mirrored in the image file can be programmed by use of object oriented programming techniques. Use of object oriented programming for data structures permit various advantages such as, for example, faster identification and reading from or writing to the data structures. Object oriented programming techniques can be used in the example data structures that have been mentioned above (e.g., VBNInfo, FSinfo, snapID, inodes, and other data structures in the WAFL file system).

Note also that the file system that is mirrored in the image file can be, for example, a write-in-place file system or a write-out-of-place file system. As known to those skilled in the art, a write-in-place file system will overwrite the old data with the new data, while a write-out-of-place file system. (e.g., WAFL) will write the new data to unallocated data blocks.

Figure 7:
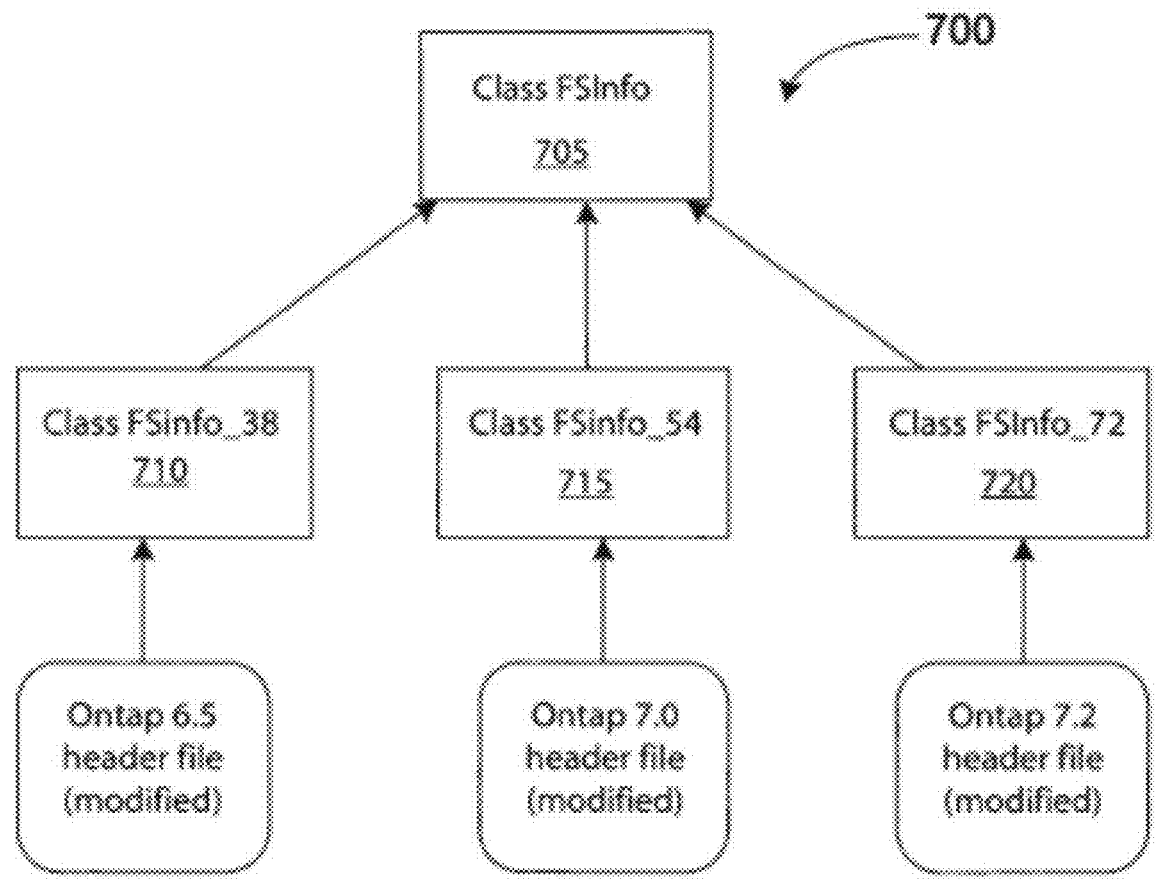
FIG. 7 is a block diagram of an abstract base class and derived classes which represents the versions file system data structures, in accordance with an embodiment of the invention.

The C++ programming language is discussed in, for example, Stroustup—"The C++ Programming Language", Addison Wesley. For purposes of brevity, various known details pertaining to object oriented programming techniques are not discussed herein. Although any Object. Oriented language can be used in an embodiment of the invention, C++ is preferred for systems that use the WAFL data structure because all WAFL data structures are currently written as C structures, and C++ programs can easily make use of C structures. It may be difficult to include the Data Ontap® header files as is. Therefore, typically only requisite structures are used to create new header files for use by these classes. As known to those skilled in the art, a header file commonly contains forward declarations of subroutines, variables, and other identifiers. The concept of base classes and subclasses (derived classes) in object oriented programming are well known to those skilled in the art. In an embodiment of the invention as shown in FIG. 7, base classes represent an abstraction of various WAFL (or other file system) data entities such as VBNInfo, FSInfo, and Inode structures. These WAFL data entities have been discussed in detail above. Specifically, FIG. 7 illustrate the use of subclasses to represent different versions of a file system data structure (e.g., FSInfo), as discussed below. The base classes are pure virtual classes, meaning they need to be subclassed in order to be instantiated. In an embodiment of the invention as shown in FIG. 7, subclasses (derived classes) represent implementation of that class for a particular version of Data Ontap® which is a registered trademark of Network Appliance Inc. For example, in FIG. 7, the base class FSInfo (705) represents an abstract base class for FSInfo, and the class FSInfo_38 (710) is a derived class which represents the version of FSInfo structure in Data Ontap version 6.5 (FSInfo version 38), while FSinfo_54 (715) represents the version of FSInfo structure in Data Ontap 7.0. If a new version of Ontap is created, a new derived FSinfo class is created to implement the new Ontap version functions. Note also that embodiments of the invention are typically used in Data Ontap versions 6.5 and later versions, because the WAFL data structure format for Data Ontap versions that are earlier than version 6.5 are significantly different from version 6.5 and later versions.

FIG. 7 is a block diagram that represents a class hierarchy 700 of the class name "FSInfo", in accordance with an embodiment of the invention. The member functions of the FSInfo class 705 are also listed and summarized in the tables of FIGS. 10A-10C. The member functions that are pertinent to an embodiment of the invention are discussed below. However, there are other member functions that are used in the WAFL file system and are not discussed herein for purposes of brevity. Note also that the member functions in FIGS. 10A-10C are only examples of possible functions that may be selectively used in an embodiment of the invention and some of the member functions in FIG. 10A-10C may also be omitted in other embodiments of the invention.

As known to those skilled in the art, in object oriented programming, a subclass (derived class) inherits the base class. A class may also be considered to be a set of objects which share a common structure and behavior. Each object is, in turn, a data structure and behavior that is defined by that object's class. The class FSInfo contains a number of functions such as, e.g., the function "virtual timeval_on_tap get_createtime ( )=0" which returns the time value (timeval) when the FSInfo was created. This means that, for example, an object of type FSInfo is guaranteed to implement the above function, and that the implementation will be provided by the derived class. As noted above, the above function is just one example function that can be used in an embodiment of the invention. Class FSInfo_38 (710) has access to header files containing data structures used in Data Ontap 6.5, and therefore it is able to provide the create time of that FSInfo (i.e., time/date when the FSInfo object was created). Note that the above create time function is just one example of the information that the Class FSInfo_38 is able to provide. Other example functions in the class FSInfo are listed in FIG. 10A, along with corresponding descriptions of the functions.

Other base classes, besides the FSinfo class 705, can be abstracted such as various WAFL data entities like, e.g., VBNInfo, and Inode structures. These WAFL data entities have been previously discussed above. FIGS. 10A-10B illustrate other possible example base classes.

When a new Data Ontap version (or generally, a new version of a storage operating system) is released, it is necessary to create only new derived classes (e.g., derived class 720 in the example of FIG. 7) which implement only the virtual functions of the base classes. Regular functions in base classes usually do not need to be overridden. Furthermore, there is no need to create new classes for WAFL (or other file system) data structures whose versions do not change across the different Data Ontap (or other storage OS) releases. For example, Data Ontap 7.0 and 7.1 both use VolInfo version 1. The VolInfo block in a WAFL file system has been discussed above. Therefore when Ontap version 7.1 was released, there was no need to implement a new class for VolInfo. Since different Data Ontap versions may have data structures with identical names (e.g., struct wafl_Disk_inode), standard C++ namespaces (context for identifiers) can be used to disambiguate (distinguish) data structures from one Data Ontap version to those of another Data Ontap version.

Figure 8:
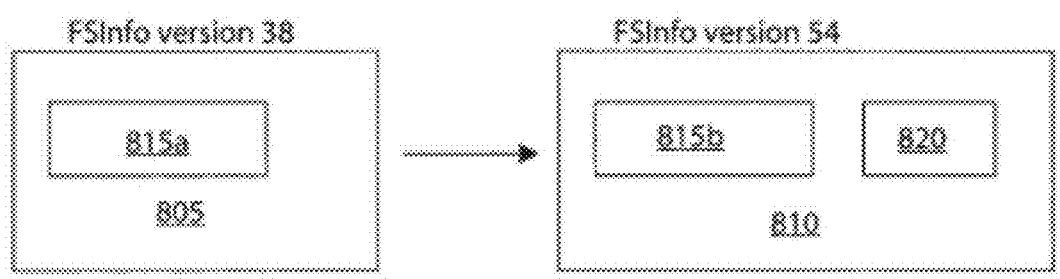
FIG. 8 shows an example of a change in file system data structure when a version of a storage operating system changes.

FIG. 8 shows an example of a change in a WAFL data structure (or other file system data structure) when a version of Data Ontap (or other storage operating system) changes. Block 805 is a representation of a data structure for the FSInfo blocks that are used in, for example, Data Ontap 6.5. Block 805 represents version 38 of the FSInfo block. Block 810 is a representation of a data structure for the FSInfo blocks that are used in, for example, Data Ontap 7.0. The principles of embodiments of the invention that are discussed in FIGS. 7 and 8 may also be applied to other file system data structures besides WAFL data structures. Block 810 represents version 54 of the FSInfo block. Blocks 805 and 810 include the data structure fields 815*a* and 815*b*, respectively. The fields 815*a* and 815*b* are identical in format and contained data structure values. Therefore, the change in versions for the FSInfo blocks did not change the field 815*a*.

However, FSInfo version 54 has a new field 820 which is called "worm_destroy_time", which is not in the FSInfo version 38. The field 820 tracks the latest retention date of any WORM file in the active file system on a WORM volume. "Worm" stands for the file type or volume type of "write-once-read-many: which are known to those skilled in the art. The volume cannot be destroyed until the latest retention date is reached. This field 820 would indicate the "timerep worm_destroy_time" which is the time when the WORM volume can be destroyed. Therefore, this field 820 is used for a compliance solution that deals with, for example, protection against network attacks.

Note that FIG. 8 shows only one example of how a WAFL data structure (e.g., FSInfo block) can change when the WAFL data structure changes in version. Other types of data structure changes are made when the WAFL data structure changes in version.

Bock 805, for the FSInfo version 38 data structure, is implemented in the subclass 710 (FIG. 7). Block 810, for the FSInfo version 54 data structure, is implemented in the subclass 715 (FIG. 7).

To the maximum extent possible, all processing is performed in the base class, and the functions are implemented by the derived class. The classes shown in FIG. 7 are used when an image file 300 is read by an application 905 (FIG. 9). As an example of how these classes of FIG. 7 may be used, consider the example of the application 905 (FIG. 9) which reads an image file 300 and lists all files and directories within a user specified directory. The sequence of the below example steps, for listing all files and directories within a user specified directory, is performed in a client, device (e.g., host 101 in FIG. 1), and references are also made to FIG. 9 and FIGS. 10A-10C for additional clarity and additional details on the function names and object names that are mentioned below:

1. User invokes the application program 905 and specifies the path to the VBN index file 500, and the path within the image file 300 whose contents need to be listed.
2. The application program 905 creates a new instance of the class SMDump using pathnames to the image file and index file. It typecasts the SMDump object to a VBNFile object. This is possible because SMDump is derived from VBNFile. As shown in FIG. 10A, the class SMDump creates a new SMDump object using user specified pathnames for an image file 300 and index file 500.
3. The application program 905 invokes the get_Volinfo( ) method on the VBNFile object to get an object of type VolInfo.
4. The application program 905 then invokes the method get_fsinfo( ) on the VolInfo object, passing in a value of zero for snapID (for the active filesystem). The implementation of the Volinfo class detects the version of FSInfo, creates an appropriate FSInfo object, and typecasts (assigns) the FSInfo object to a generic FSInfo object.
5. The application program 905 invokes the method walk_path( ) on the FSInfo object, passing in the pathname of the directory to be listed. The method implementation recursively looks up each directory entry component in the path, and creates an Triode object of the final component of the path.

6. The application program 905 invokes the get_dirblock( ) method of the mode object, and obtains a DirBlock object. The get_dirblock( ) method creates a DirBlock object which represents the directory blocks of an mode. This method (function) can only be invoked on an mode of type directory or type stream directory.

7. The application program 905 then invokes, begin_dirwalk( ) method of this object, and repeatedly invokes the next_ent( ) method of the DirBlock object. Each time next_ent( ) is invoked, an object of type WaflDirent representing the next directory entry is returned.

8. The application program 905 invokes the get_name( ) (or a variant thereof) method of the WaflDirent object to get the name of the directory entry, which the application program 905 prints (or displays) on a console of host 101.

9. Once all directory entries have been printed, the application program 905 invokes the DirBlock object's close_dirwalk( ) method, to free up resources (e.g., free up memory resources or close file handles).

10. The application program 905 then deletes the DirBlock, FSInfo, Volinfo, VBNFile objects in that order and exits.

It is noted that in other implementations, various steps above can be modified or omitted.

FIGS. 10A-10C show example functions that can be performed by the FSInfo class 705 of FIG. 7, as well as other types of base classes that can be used on the WAFL data structures, in accordance with an embodiment of the invention. Therefore, the details in FIGS. 10A-10C are shown for purposes of listing various example functions and are not intended to be limiting to the scope of embodiments of the invention. Most example procedures or functions that are shown in FIGS. 10A-10C are member functions of different classes. These functions are invoked by an instance of objects. Some of these functions generate other objects. However, there is also a need for "standalone" functions. The sole objective of these standalone functions is to create new objects. For example, a function called get_FSInfo_38( ) creates an object of type FSinfo_38 (FSInfo version 38). This object is typecasts as a generic FSInfo object. The inputs to this function will include a Volinfo object and a buffer containing the WAFL data structure "wafl_Fs_info", version 38. Standalone functions are not accessible to user level applications, rather they are invoked by instances of various classes.

To obtain an inode file of a volume, note that the inode of the inodefile is stored inside the WAFL FSInfo data structure. Once the inode of the inodefile is obtained, the contents of the entire inodefile can accessed using the same functions used to access the inodes in a WAFL file system. The virtual function get_inofile_inode( ) (FIG. 10A) of the class FSInfo 705 is used for obtaining an object representing the inode of the inodefile.

To obtain a listing of named PPTIs (e.g., snapshots) and corresponding PPTI identifiers (e.g., snapIDs) in a file system, the below steps are performed by the application 905 (FIG. 9). Note that PPTI names are stored by WAFL in a special directory. The directory entries correspond to names of PPTIs, and the inode numbers are snapIDs. Therefore, in order to list all PPTIs, an application program 905 would have to follow same steps enumerated above (starting from step 1 above), but instead interprets the directory entry names as PPTI names, and interprets the inode numbers as snapIDs.

To extract contents of a file in an image file 300, for a given pathname or inode number, the application 905 performs the below steps.

(1a) The application 905 repeats the above-discussed steps 1 through 4.

(2a) If the user provides a pathname, the application 905 executes step 5 above. If the user provides an inode number, the application 905 directly calls the get inode function of the FSInfo object generated in step 4 above. In either case, the end result of this step is an Inode object representing the file of interest.

(3a) The application 905 needs to create a subclass of BuftreeWalker (class BuftreeWalker is shown in FIG. 10B). This application specific subclass of BuftreeWalker will store the contents of the file to a computer, or send the contents to a printer, fax, and/or email, as desired by the user.

(4a) The application 905 then invokes the walk buftree( ) function of the Anode object created in step (2a), using the subclass of BuftreeWalker generated in step (3a).

(5a) An implementation of an embodiment of this invention will iterate over all level 0 block (data blocks) of the inode, calling the "gotbuf( )" or "gothole( )" functions of the subclass of BuftreeWalker generated in step (3a), for every data block or hole in the inode. As shown in FIG. 10B, the gotbuf( ) function gets called when a buftree iterator function encounters a level 0 block, and a data buffer is passed to this function. The gothole( ) function gets called when one or more "hole blocks" (empty blocks) are encountered, and the number of hole blocks encountered are passed to this function.

(6a) The process concludes when all level 0 blocks have been iterated over. The output file may be truncated to the exact original file size. The file size can be obtained by invoking the "getsize( )" function of the mode object generated in step (2).

(7a) All objects generated are destroyed and allocated resources are freed up.

It is noted that in other implementations, various steps above can be modified or omitted.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation. Claims will follow and may require edits based on any edits above.

What is claimed is:

1. A method comprising:
   creating a snapshot of a file system as an image file comprising chunks, wherein each chunk comprises a plurality of data blocks of the file system and a chunk header comprising volume block numbers of the plurality of data blocks;

populating an index file with entries mapping volume block numbers specified within chunk headers to relative locations of the volume block numbers within the image file;

receiving a request to access selected information within the image file, wherein the request specifies a volume block number of a requested data block of the selected information;

querying the index file using the volume block number of the requested data block to identify a relative location of the volume block number within the image file; and utilizing the index file to obtain the selected information from the image file by extracting a first data portion of the image file comprising the requested data block using the relative location without extracting a second data portion of the image file.

2. The method of claim 1, wherein the volume block numbers are stored according to a non-sequential order within the image file.

3. The method of claim 1, comprising:
using a writer thread to process the chunk header and to write virtual block numbers into the index file.

4. The method of claim 1, comprising:
using a base class to represent a data structure comprising information associated with the image file.

5. The method of claim 4, comprising:
using a derived class to represent a version of the data structure, wherein the derived class inherits the base class.

6. The method of claim 1, wherein the utilizing the index file comprises: reading the index file to determine a location of the selected information in the image file without restoring the image file.

7. The method of claim 1, wherein the utilizing the index file comprises:
extracting contents of a file, for a given pathname, from the image file.

8. The method of claim 1, wherein the utilizing the index file comprises: extracting contents of a file, for a given inode number, from the image file.

9. The method of claim 1, wherein the utilizing the index file comprises: extracting contents of a file in a meta directory of the image file.

10. The method of claim 1, wherein the utilizing the index file comprises: extracting contents of a prior operating system version from the image file.

11. The method of claim 1, wherein the utilizing the index file comprises: extracting a stream directory from the image file.

12. A non-transitory machine-readable medium having stored thereon instructions for performing a method that causes a machine to:
creating a snapshot of a file system as an image file comprising chunks, wherein each chunk comprises a plurality of data blocks of the file system and a chunk header comprising volume block numbers of the plurality of data blocks;

populating an index file with entries mapping volume block numbers specified within chunk headers to relative locations of the volume block numbers within the image file;

receiving a request to access selected information within the image file, wherein the request specifies a volume block number of a requested data block of the selected information;

querying the index file using the volume block number of the requested data block to identify a relative location of the volume block number within the image file; and utilizing the index file to obtain the selected information from the image file by extracting a first data portion of the image file comprising the requested data block using the relative location without extracting a second data portion of the image file.

13. A computing device comprising:
a memory containing a machine-readable medium comprising instruction for performing a method; and
a processor coupled to the memory, the processor configured to execute the instructions to cause the processor to:

creating a snapshot of a file system as an image file comprising chunks, wherein each chunk comprises a plurality of data blocks of the file system and a chunk header comprising volume block numbers of the plurality of data blocks;

populating an index file with entries mapping volume block numbers specified within chunk headers to relative locations of the volume block numbers within the image file;

receiving a request to access selected information within the image file, wherein the request specifies a volume block number of a requested data block of the selected information;

querying the index file using the volume block number of the requested data block to identify a relative location of the volume block number within the image file; and utilizing the index file to obtain the selected information from the image file by extracting a first data portion of the image file comprising the requested data block using the relative location without extracting a second data portion of the image file.

14. The computing device of claim 13, wherein the instructions cause the processor to:
use a reader thread to read chunk headers in the chunks in the image file.

15. The computing device of claim 13, wherein the volume block numbers are stored according to a non-sequential order within the image file.

16. The computing device of claim 13, wherein the instructions cause the processor to:
read the index file to determine a location of selected information in the image file without restoring the image file.

17. The computing device of claim 13, wherein the index file comprises an entry indicating a location of a data block in the image file for a given virtual block number.

* * * * *